(12) United States Patent
Grdina

(10) Patent No.: US 6,965,872 B1
(45) Date of Patent: Nov. 15, 2005

(54) SYSTEMS, METHODS AND COMPUTER PROGRAM PRODUCTS FOR FACILITATING THE SALE OF COMMODITY-LIKE GOODS/SERVICES

(75) Inventor: Jerome M. Grdina, Shaker Heights, OH (US)

(73) Assignee: Zipandshop LLC, Shaker Heights, OH (US)

( * ) Notice: Subject to any disclaimer, the term of this patent is extended or adjusted under 35 U.S.C. 154(b) by 198 days.

(21) Appl. No.: 09/630,514

(22) Filed: Aug. 2, 2000

(51) Int. Cl.[7] .............................................. G06F 17/60
(52) U.S. Cl. ......................................... 705/26; 705/14
(58) Field of Search ............................. 705/26, 20, 25, 705/14, 35; 701/200

(56) References Cited

U.S. PATENT DOCUMENTS

| | | | |
|---|---|---|---|
| 5,873,069 A | * | 2/1999 | Reuhl et al. ................. 235/375 |
| 5,899,980 A | | 5/1999 | Wilf et al. |
| 5,918,214 A | | 6/1999 | Perkowski |
| 5,950,173 A | | 9/1999 | Perkowski |
| 5,963,916 A | | 10/1999 | Kaplan |
| 5,966,697 A | | 10/1999 | Fergerson et al. |
| 5,970,474 A | | 10/1999 | LeRoy et al. |
| 5,974,418 A | | 10/1999 | Blinn et al. |
| 6,014,644 A | | 1/2000 | Erickson |
| 6,016,504 A | | 1/2000 | Arnold et al. |
| 6,169,955 B1 | * | 1/2001 | Fultz ............................ 340/988 |
| 6,249,772 B1 | * | 6/2001 | Walker et al. ................. 705/26 |

FOREIGN PATENT DOCUMENTS

WO   WO/002093302 A2 * 11/2002

OTHER PUBLICATIONS www.ottawagasprices.com, Oct. 13, 1999.*
http://www.ottawagasprices.com, Oct. 13, 1999, http://web.archive.org/web/*/http://www.ottawagasprices.com.*
http://www.flyingj.com, Jan. 25, 1999, http://web.archive.org/web/*/http://www.flyingj.com.*

* cited by examiner

*Primary Examiner*—Jeffrey A. Smith
*Assistant Examiner*—Matthew S Gart
(74) *Attorney, Agent, or Firm*—Hahn Loeser +Parks LLP

(57) ABSTRACT

The invention provides systems and methods for facilitating the sale of commodity-like goods/services. The commodity-like goods/services at which the invention is directed, are of a type that are relatively indistinguishable from one brand, identity and/or outlet to another in end-use functionality and features. These types of goods/services are many times sold at retail under various brands or identities at multiple locations, to the final end user. Such goods/services may also or separately be of a type that are repeatedly purchased at intervals, and/or for which the price varies between purchases, from outlet to outlet or brand to brand. The goods/services may also be of a character such that they are not deliverable to the consumer, but require the consumer to travel to the retailer outlet. The system and methods also provide information relating to the consumers and competitors of a retailer of such goods/services. The invention establishes methods and procedures to define, organize, collect, distribute, and maintain information that can be used by the owner of a business selling commodity-like goods/services as well as by its customers. This information may include, but is not limited to, name brand of the product, location of the retailer, price of the product, other related goods/services available and their prices, and promotions. These processes may be performed and implemented on a computer network that is accessible in real time via a suitable communication device, such as a computer, wireless communication device, telephone or the like. A database of such information is created, allowing the consumer and other retailers to query the database using various search criteria. The consumer has the opportunity to obtain information about retailers of commodity-like goods/services that meet the consumer's requirements, and pricing may be guaranteed by the retailer.

14 Claims, 16 Drawing Sheets

Fig. 6

Fig. 7 zipgas.^(SM).com welcomes... Fred's Super Green Service
In your neighborhood since 1970

Search: Map: Retailer

| BRAND | ECON | REG | PLUS | SUPER | EXTRA | DIESEL | DIESEL+ |
|---|---|---|---|---|---|---|---|
| Green | 124⁹ | 137⁹ | 140⁹ | 162⁹ | 189⁹ | 143⁹ | 159⁹ |

June 01, 2000
9:30AM
10:30AM

Refresh Prices

Add to Profile

Print Guarantee

It is now
Your price is guaranteed until
Learn more

Address:
12300 Market Street, Anytown, ST 54451-0001
Phone 800-330-0033
email: fred@supergreen.com
http://www.brandnames.com Special Message(s):
$99.00 Tune-up
Includes: Spark plugs, rotor, condenser and cap, set timing, carburetor adjustment, fuel and air filters (Prices may vary for 8 cylinder vehicles.)

$29.00 Oil Change
Includes: Liquid refills, filter, change, tire fills. Oil change in ten minutes or less or your money back. Prices may vary with different vehicles and older models. Come into the shop for details.

Features:
- ATM
- Open 24 Hrs.
- Car Wash
- Oil Change
- Visa/MC/Discover
- Towing
- Snack Shop 2 Hotdogs for 2 Bucks
Good thru July
Print Coupon No Charge ATM's
Take out Only
No Deposits 10% off Car Washes
Good thru Summer 2000
Print Coupon HOME | RETAILERS PROFILE | MOTORISTS PROFILE | CUSTOMER SERVICE | PUBLIC INTEREST | TUTORIAL | SITE MAP

160

| HOME | RETAILERS PROFILE | MOTORISTS PROFILE | CUSTOMER SERVICE | PUBLIC INTEREST | TUTORIAL | SITE MAP | welcome to zipgas".com The best place on the Net for gas prices...and more!

Home: Motorist Profile

161 — Please enter/update your profile information as detailed below:
Basic User Information:
162 — First Name:
163 — Last Name:
164 — Street Address:
165 — Street Address #2:
166 — City:
167 — State: [State ▽]
168 — Zip Code:
169 — Phone Number:
170 — Email Address:
171 — Login Information
172 — Username:
173 — Password:
174 — Verify Password:

175 — Key Phrase Information:
The purpose of the key phrase is to assist you if you've forgotten your password. If you ever forget your password the 'Key Phrase' will be displayed. Then you will be asked to enter the 'Key Phrase Value'. Upon successfully entering the value, you will be given your password.

176 — Key Phrase:
177 — Key Phrase Value:

178 — Stored Outlets: 180  181  182  183

| ADDRESS | BRAND | MILES | ECON | REG | PLUS | SUPER | EXTRA | DIESEL | DIESEL+ | Remove |

179 —
NO OUTLETS TO DISPLAY

184 — Sorting Preference: [Choose 1 ▽]
185 — IVR Listening Preference: [Choose 1 ▽]
186 — [Submit]

Fig. 9

| HOME | RETAILERS PROFILE | MOTORISTS PROFILE | CUSTOMER SERVICE | PUBLIC INTEREST | TUTORIAL | SITE MAP | welcome to zipgas™.com The best place on the Net for gas prices... and more!

Home: Retailer Profile

Please enter/update your profile information as detailed below:

Basic User Information:
- First Name:
- Last Name:
- Retail Outlet Name:
- Gas Name:
- Brand Name:
- Street Address:
- Street Address #2:
- City:
- State: [State ▽]
- Zip Code:
- Phone Number: [  ]-[  ]
- Fax Number: [  ]-[  ]
- Email Address:
- Display Email Address: Yes ● No ○
- Web Site Address: http://
- Retail Outlet/Company Motto:

Login Information:
Your initial password and the clerk's initial password will be mailed to you using the above address. Once you receive the passwords in the mail you will have the opportunity to change them here.

- Username:
- Clerk's Username:

Key Phrase Information:
The purpose of the key phrase is to assist you if you've forgotten your password. If you ever forget your password the 'Key Phrase' will be displayed. Then you will be asked to enter the 'Key Phrase Value'. Upon successfully entering the value, you will be given your password.

- Key Phrase:
- Key Phrase Value:
- Clerk's Key Phrase:
- Clerk's Key Phrase Value:

| HOME | RETAILERS PROFILE | MOTORISTS PROFILE | CUSTOMER SERVICE | PUBLIC INTEREST | TUTORIAL | SITE MAP | welcome to zipgas".com The best place on the Net for gas prices...and more!

Home: Clerk Profile

Please enter/update your profile information as detailed below:

282 — Basic User Information:
283 — First Name: [Fred]
284 — Last Name: [Doe]
285 — Retail Outlet Name: [Fred's Super Green Service]
286 — Gas Name: [Green]
287 — Brand Name: [Green]
288 — Street Address: [12300 Market Street]
289 — Street Address #2: [ ]
290 — City: [Anytown]
291 — State: [State ▽]
292 — Zip Code: [54451]
293 — Phone Number: [   ]-[   ]
294 — Fax Number: [   ]-[   ]
295 — Email Address: [fred@supergreen.com]
296 — Display Email Address: Yes ● No ○
297 — Web Site Address: http:// [www.brandnames.com]
298 — Retail Outlet/Company Motto: [in your neighborhood since 1970]

Login Information:
299 — Clerk's Username: retailer_clerk
300 — Clerk's Password: [******]
301 — Verify Clerk's Password: [******]

302 — Key Phrase Information:
The purpose of the key phrase is to assist you if you've forgotten your password. If you ever forget your password the 'Key Phrase' will be displayed. Then you will be asked to enter the 'Key Phrase Value'. Upon successfully entering the value, you will be given your password.

303 — Clerk's Key Phrase: [What is the name of my dog?]
304 — Clerk's Key Phrase Value: [Ford]

*Fig. 14*

305 — Retail Outlet Information:
306 — Price Guarantee: [10] hours
307 — Product Prices:
    Select    Gas Type (309)    Gas Price (310)
308 — ☑        Economy          $ [1.249]
      ☑        Regular          $ [1.379]
      ☑        Plus             $ [1.499]
      ☑        Super            $ [1.629]
      ☑        Extra            $ [1.699]
      ☑        Diesel           $ [1.439]
      ☑   313— Diesel+          $ [1.599]   315
311 — Stored Outlets:
312 —

| ADDRESS | BRAND | MILES | ECON | REG | PLUS | SUPER | EXTRA | DIESEL | DIESEL+ |
|---|---|---|---|---|---|---|---|---|---|
| 5500 Franklin St. | Yellow | 1.40 | 129⁹ | 140⁹ | 149⁹ | 162⁹ | 189⁹ | 143⁹ | 159⁹ |
| 342 South St. | Green | 0.23 | — | 139⁹ | 149⁹ | 162⁹ | — | — | — |
| 3485 S. Third Ave. | Red | 0.30 | — | — | — | — | — | — | — |
| 9812 Center Rd. | Shell | 0.50 | 129⁹ | 136⁹ | 149⁹ | 162⁹ | 189⁹ | 143⁹ | — |
| 9813 Center Rd. | Yellow | 0.50 | 129⁹ | 137⁹ | 149⁹ | 162⁹ | 189⁹ | — | — |
| 174 Broad St. | Red | 0.60 | — | 139⁹ | 149⁹ | — | — | 143⁹ | — |
| 7461 State Rd. | Blue | 1.05 | — | 138⁹ | 149⁹ | — | — | 143⁹ | — |
| 6800 State Rd. | Blue | 1.22 | 129⁹ | 139⁹ | 149⁹ | 162⁹ | 189⁹ | 143⁹ | 159⁹ |

316 — Sorting Preference: [Price ▽]
317 — IVR Listening Preference: [Regular, Plus & Super ▽]
318 — [Submit]

Fig. 15

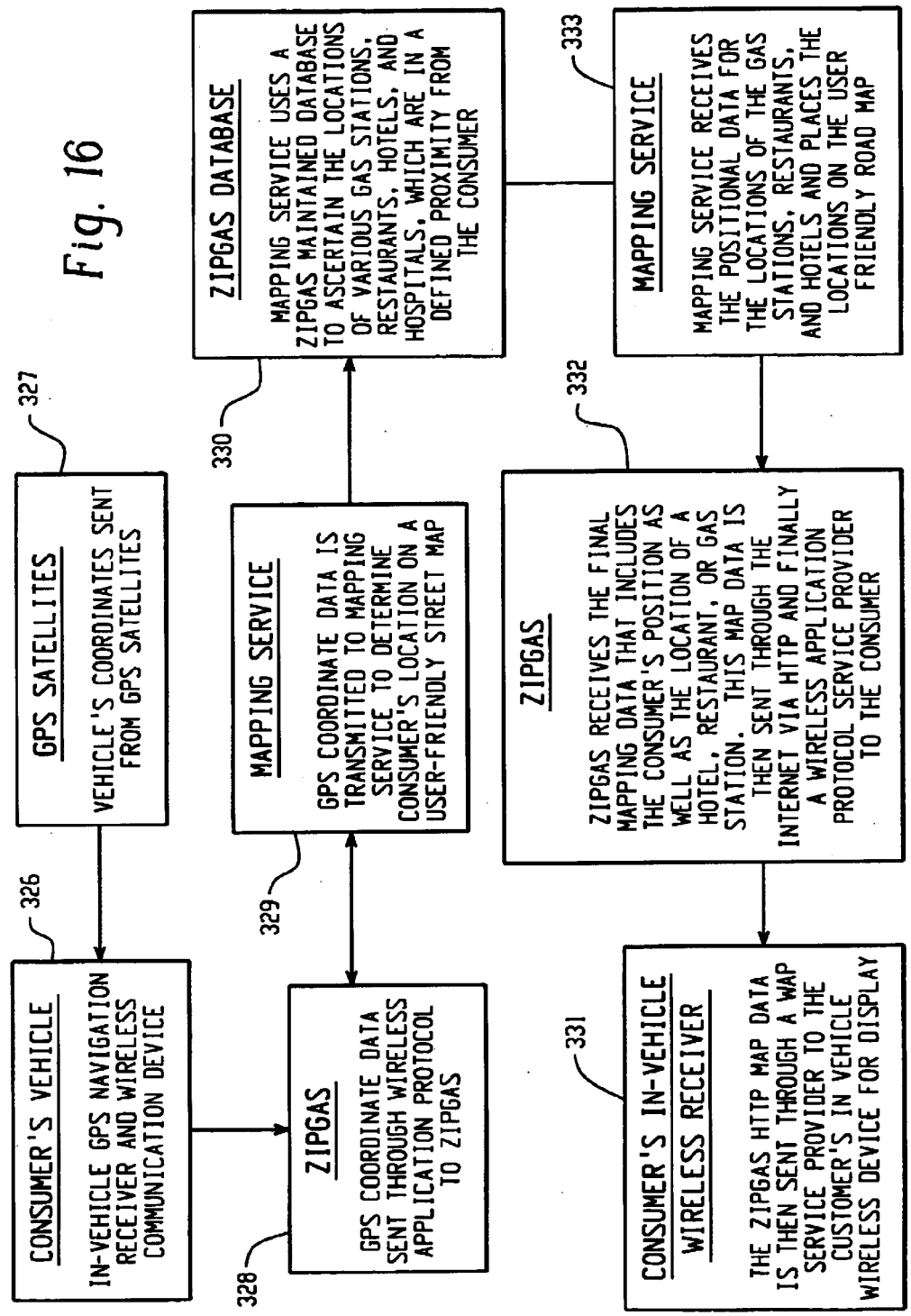

SYSTEMS, METHODS AND COMPUTER PROGRAM PRODUCTS FOR FACILITATING THE SALE OF COMMODITY-LIKE GOODS/SERVICES

TECHNICAL FIELD

The present invention relates generally to systems and methods for facilitating the sale of retail goods and/or services that are not easily or readily delivered to the consumer, or where the prices of such goods and/or services are not readily determined except at the retail outlet, such as vehicle fuels.

BACKGROUND OF THE INVENTION

Various retail goods/services cannot be purchased/performed other than at the outlet of the retailer of such goods/services. Goods such as gasoline, diesel fuel, propane and a variety of other fuels, as well as services including vehicle repair or servicing, laundry and dry cleaning services, food service and the like, must generally be physically acquired at the retail outlet.

As with most items for sale, consumers of retail goods/services that are generally not deliverable to the consumer are interested in finding them at convenient and/or nearby locations, and/or finding them while traveling for other reasons, such as work, recreation, and/or other shopping. Unfortunately, the consumer presently has only limited ways to determine if a particular retailer of such goods/services has additional goods/services that may be of interest. For example, vehicle fuel or like retailers often have convenience store items available at their outlet, or provide vehicle repair or servicing, but the consumer may generally be unaware of these other goods/services unless/until they actually visit the outlet. In addition, vehicle fuel or like retailers have other features that are of interest to consumers, such as hours of operation, acceptance of credit cards, and automated teller machines (ATMs). From the point of view of both consumers and retailers, it would be worthwhile to provide consumers with information relating to the array of goods/services provided by the retailer without the consumer having to visit the outlet.

Additionally, retail consumers of goods/services that are subject to frequent, volatile, and/or asynchronous (meaning non-uniform over time or without a consistent pattern between various retailers) price fluctuations, are interested in finding the most attractive price for such goods/services. For example, a vehicle owner typically purchases fuel about 1.2 times per week, and the price of the fuel may vary within this period. The most attractive price is not necessarily the lowest price, but it is that price which the consumer judges to be best in terms of a variety of factors, including those such as quality, convenience, and other subjective factors. Unfortunately, in the case of these types of goods/services, the consumer often has to drive around to assess the prices of competing retailers in order to determine which retailer has the most attractive price. As a result, much time, vehicle operating expense, and effort can be expended in trying to determine the most attractive price. Further, because of the frequent, volatile, and/or asynchronous price fluctuations of such goods/services, consumers find that prices can change between the time that they are observed and the time that the purchase is consummated. From the point of view of both consumers and retailers, it would be worthwhile to have the ability to provide consumers with information relating to the pricing of the goods/services without the consumer having to visit the outlet, and to assure that the price information communicated to consumers was honored by the outlet, for at least a specified period of time.

Further, retailers attempt to attract customers through costly advertising on television, radio, or in print, but again limitations exist as to what information can be conveyed to the consumer. In some cases, the prices of these goods/services are so volatile that it is impractical to advertise them other than at the outlet where they are purchased. A retailer must also promote and advertise its other secondary goods/services such as convenience store items or vehicle repair, which are often purchased in tandem with a product such as vehicle fuel. It would be worthwhile to retailers to have other media, and/or lowest cost media, for communicating with consumers.

However, advertising is a passive form of communication and it does not allow the retailer of these commodity-like goods or services to compile current, actual demographic data of its customers. Without this data, a retailer can only infer what the needs of his consumers are. As a result, the retailer may offer goods/services that do not precisely meet the needs of the consumer, or the retailer may miss out on revenue opportunities by not providing the goods/services that consumers are interested in purchasing. It would be worthwhile to retailers to be able to collect better information about the interests of their consumers.

It is also difficult for retailers, relative to their competition, to assess pricing and other variables for these types of goods/services. Retailers of these types of goods/services incur additional expenses, such as the labor and vehicle expense associated with driving around, in order to ascertain the current prices of such goods/services sold by their competitors. This is particularly true when the price of such goods/services may be subject to rapid, volatile, and asynchronous price fluctuations in the marketplace. Further, retailers are sometimes limited in collecting this information because of work schedules, distances between competitors, traffic, and other factors. It would be worthwhile to retailers to reduce the expenses associated with gathering information about the current prices of such goods/services sold by their competitors, and/or to be able to collect such information more frequently and/or more easily.

It would thus be of great value to provide systems and methods which better allow the consumers and retailers of such goods/services to communicate and acquire information relating to such goods/services without having to travel to the retail outlet(s).

SUMMARY OF THE INVENTION

Based upon the foregoing deficiencies in the prior art, it is an object of the present invention to provide systems and methods for facilitating the sale of commodity-like goods/services. The commodity-like goods/services at which the invention is directed, are of a type that are relatively indistinguishable from one brand, identity and/or outlet to another in end-use functionality and features. These types of goods/services are many times sold at retail under various brands or identities at multiple locations, to the final end user. Such goods/services may also or separately be of a type that are repeatedly purchased at intervals, and/or for which the price varies between purchases, from outlet to outlet or brand to brand. The goods/services may also be of a character such that they are not deliverable to the consumer, but require the consumer to travel to the retailer outlet.

It is also an object of the invention to provide systems and methods for facilitating the sale of goods/services which are subject to rapid, volatile, and/or asynchronous price fluctuations.

The present invention is also directed to providing information relating to the consumers and competitors of a retailer of such goods/services.

The present invention establishes methods and procedures to define, organize, collect, distribute, and maintain information that can be used by the owner of a business selling commodity-like goods/services as well as by its customers. This information may include, but is not limited to, name brand of the product, location of the retailer, price of the product, other related goods/services available and their prices, and promotions. These processes may be performed and implemented on a computer network that is accessible in real time via a suitable communication device, such as a computer, wireless communication device, telephone or the like. The invention is directed to creating a database of such information, and allowing the consumer and other retailers to query the database using various search criteria. The consumer has the opportunity to obtain information about retailers of commodity-like goods/services that meet the consumer's requirements. The consumer then has the opportunity to evaluate which retailer to purchase items from. The pricing information the consumer is presented with for such goods/services may be guaranteed by the retailer. Other retailers have the opportunity to obtain information about retailers of commodity-like goods/services with whom they compete. They then have the opportunity to evaluate the scope of goods/services that the other retailers offer, their prices, and other terms and conditions.

Based upon the foregoing, in one aspect of the invention, there is provided a system for acquiring and disseminating information related to goods/services comprising a user interface having at least one input device to enable a user to input predetermined information relating to predetermined goods or services. The predetermined goods/services may have pricing which is subject to substantial variations, or are not deliverable to a consumer. There is also provided a method for generating a database relating to goods/services sold via retail outlets, comprising the steps of prompting a user to input information related to a retail outlet selected from the group of vehicle fuel outlets, vehicle servicing outlets, convenience food stores and combinations thereof. The input information is selected from the group consisting of location of the retail outlet, brand information, price information, goods sold, services offered, special promotions on goods or services, price guarantees on goods or services or combinations thereof.

Additionally, a method of providing a guaranteed price in the sale of goods/services is set forth. Firstly, the consumer is provided with predetermined information relating to at least the price of goods/services presently being offered. The consumer is also provided with a predetermined guarantee related to at least the price of goods/services, for some pre-authorized period of time, which guarantee can be authenticated and redeemed at the outlet where said goods/services are offered for sale. Other methods and a computer program product are also set forth.

BRIEF DESCRIPTION OF THE DRAWINGS

Other aspects, advantages and attributes of the invention will become apparent upon a reading of the description of embodiments thereof along with the figures, wherein:

FIGS. 2–9 show pages associated with a site on a global information system such as shown in FIG. 1, according to an embodiment of the invention.

FIGS. 11–15 show further pages associated with a site on a global information system according to an embodiment of the invention.

FIG. 16 shows a block diagram of a further embodiment according to the invention.

DETAILED DESCRIPTION OF THE PREFERRED EMBODIMENT

Figure 1:
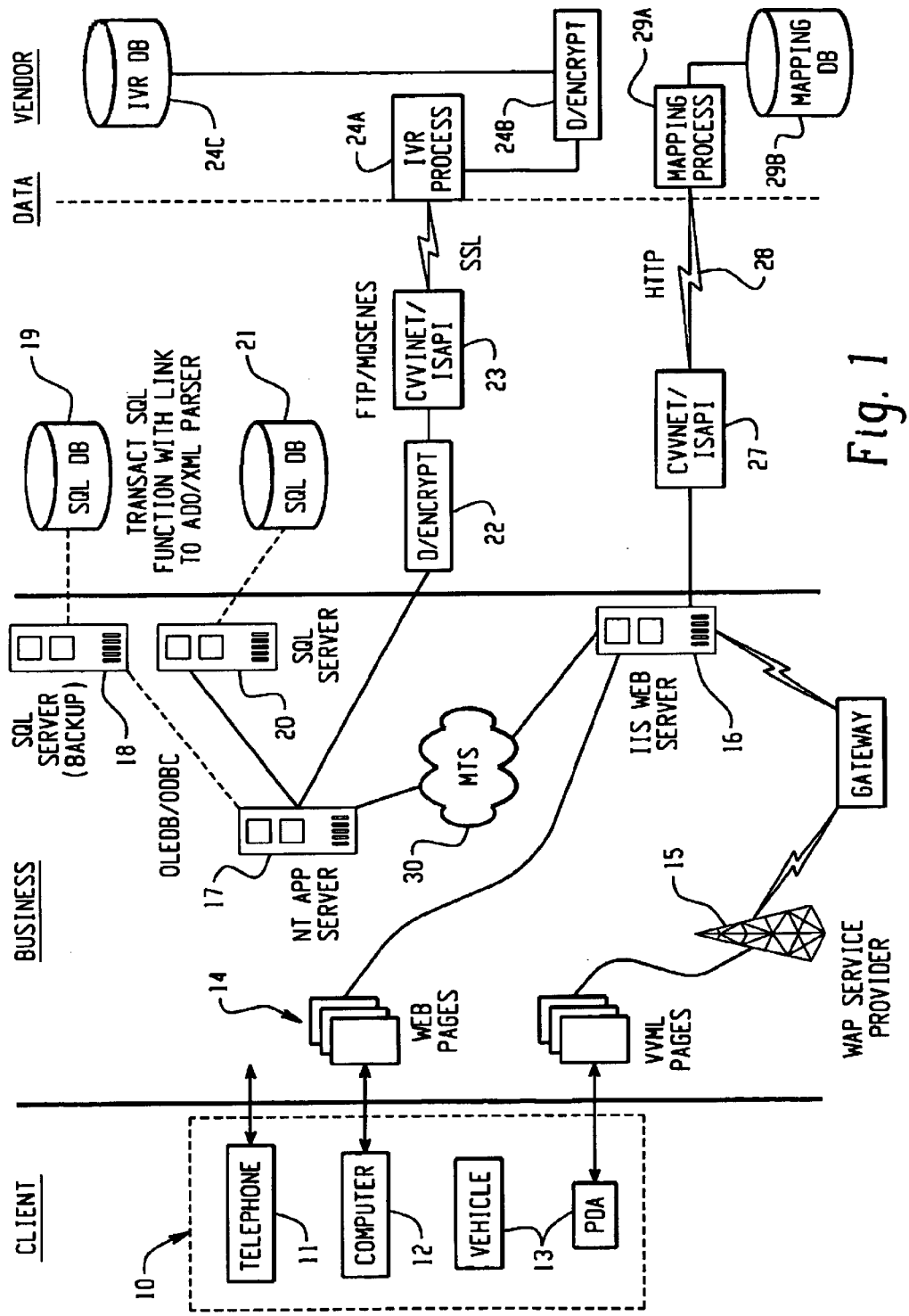
FIG. 1 is a schematic illustration of an embodiment of the present invention, implemented via a site on a global information system, i.e. a website on the World Wide Web.

The present invention is fully described hereinafter with reference to the drawings, in which preferred embodiments of the invention are shown. The invention may also be embodied in many different forms and should not be construed as limited to only the disclosed embodiments. The provided embodiments are included so the disclosure will be thorough, complete and will fully convey the scope of the invention to persons of ordinary skill in the art.

A person of ordinary skill in the art would appreciate that the present invention may be embodied as a method, data processing or acquisition system, or computer program product. As such, the present invention may take the form of an embodiment comprised entirely of hardware; an embodiment comprised entirely of software or an embodiment combining software and hardware aspects. In addition, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

The present invention is described with reference to flowcharts and/or diagrams that illustrate methods, apparatus or systems and computer program product. It should be understood that each block of the various flowcharts, and combinations of blocks in the flowcharts, can be implemented by computer program instructions. Such computer program instructions can be loaded onto a general-purpose computer, special purpose computer, or other programmable data processing device to produce a machine, such that the instructions that execute on the computer or other programmable data processing apparatus create means for implementing the functions specified in the flowcharts. The computer program instructions can also be stored in a computer-readable memory that directs a computer or other programmable data processing device to function in a particular manner, such that the instructions stored in the computer-readable memory produce an article of manufacture including instruction means which implement the function specified in the flowcharts or diagrams. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowcharts or diagrams.

It will be understood that blocks of the flowcharts support combinations of systems for performing the specified functions, combinations of steps for performing the specified functions and program instructions for performing the specified functions. It is also to be understood that each block of the flowcharts or diagrams, and combinations of blocks in the flowcharts or diagrams, can be implemented by special purpose hardware-based computer systems which perform the specified functions or steps, or combinations of special purpose hardware and computer instructions.

The present invention could be written in a number of computer languages including, but not limited to, C++, Basic, Visual Basic, Fortran, Cobol, Smalltalk, Java, and other conventional programming languages. It is to be understood that various computers and/or processors may be used to carry out the present invention without being limited to those described herein. The present invention runs on standard computers such as IBM or IBM-compatible or Apple/Macintosh personal computers, utilizing suitable operating systems. However, it should be understood that the present invention could be implemented using other computers and/or processors, including, but not limited to, mainframe computers and mini-computers.

Currently consumers of price sensitive or commodity-like retail goods/services often drive to the outlet at which the commodity-like goods/services are being sold in order to determine the current selling price of the particular item or service. Specifically, both private and commercial consumers are interested in the price of commodity-like goods/services such as vehicle fuels because the product's price is often subject to rapid, volatile, and asynchronous fluctuations. Furthermore, operators of fleet and cargo transportation companies must constantly scrutinize the price of these fuels because of the impact that vehicle fuel prices have on their cost structure. However, even though fuel prices affect a vast array of business and personal decisions, there is presently no method or system for tracking prices in real-time, reserving a price in advance for commodity-like goods/services, such as vehicle fuels, and/or accessing competitor information relating to such commodity-like goods/services. Commercial and private consumers of these and similar goods/services often drive to the outlet at which the commodity-like goods/services are sold to determine the price, expending valuable time, effort, and resources. It would therefore be desirable to provide a method and system for compiling prices of commodity-like goods/services in one central location, such as a web site or other easily accessible location. The present invention provides this ability, by allowing a user to determine the current price of commodity-like goods/services among various competitors. This creates a tremendous breakthrough from a buyer's perspective. However, the invention builds on its foundation of centralized commodity-like goods/services price data and has increased the utility of its system to the user, by creating a method where a consumer can receive a price guarantee on particular commodity-like goods/services for a fixed amount of time. Commercial and private consumers of vehicle fuel as an example, would then be able to save time, money and effort by simply accessing the interface of the invention, such as a web site, comparing the prices of the commodity-like goods/services among various retailers, and then printing a price guarantee for that item. Furthermore, by allowing a commercial consumer to be able to "lock into" commodity-like goods/services at a specific price, the business can take advantage of market conditions to make a large purchase for its entire fleet. As a result, the invention can be an essential tool in the competitive fleet and transportation industries which purchase hundreds of thousands of gallons of fuel each year. By having the ability to instantly determine the most attractive vehicle fuel price among competing vehicle fuel retailers prior to purchasing, commercial entities can budget and reduce costs. Thus, the invention can be/can become a valuable tool for accessing price information of commodity-like goods/services, that is easy to use and will save both private and commercial consumers time, effort and money.

As a further aspect of the invention, fleet operators have the ability to plan a route in which fleet trucks will be able to get extended term fuel price guarantees to provide for the long distance that the trucks will be traveling. Therefore, as the truck goes from vehicle fuel retailer to retailer, the truck operator will have in advance, established a guaranteed price along the travel route.

It is also a distinct advantage of the present invention to provide the retailer with an enhanced ability to monitor its competition. This enhanced ability will allow the business owner to monitor price movement of a product or service over time, and trends relating to competitors and consumer purchasing activities. Additionally, the business owner now has a tool to inform the consumer of its attributes, specials or other information, which will facilitate drawing the consumer to their facility.

Referring now to FIG. 1, a diagram of a preferred embodiment of an interactive commodity-like goods/services price reservation and data collection/dissemination system and computer network is shown. The system may be embodied in a computer network comprising an input/output system 10 that allows consumers a simple and convenient method of determining what the price of certain commodity-like goods/services in a certain user-defined area. Retailers of commodity-like goods/services are also able to input current price data and other advertising or service information into the system as well as receive information on what price competitors are selling their goods/services. This input/output system 10 may comprise any modality of communication, such as a telephone 11, a computer 12, and a wireless type of communication device 13 (e.g., a personal data assistant, in-vehicle communication device or cell phone as merely examples), or combination of any of these. Further devices such as in-vehicle wireless communication devices may provide a communication link by which data can be entered and/or received from the system, including possibly location information. The computer 12 and wireless communication device 13 may use a global information network, such as the Internet, to present an interface to the user, such as a web site having web pages 14 to allow the users to access the system. The web pages 14 provide information and access to information for the computer user, with the information stored or accessed via a web server 16. The user of a wireless device has their information transferred through a Wireless Application Protocol Service Provider 15 via the web server 16. The system may further include a network application server 17 which coordinates access to the Structured Query Logic (SQL) backup server 18 that accesses an SQL database 19. The SQL backup server may be utilized to store and retrieve data in the event that SQL server 20 goes offline. The network server 17 may also communicate with a (SQL) server 20 which uses an (SQL) database 21 to store and retrieve queried data. In the embodiment shown, web server 16 and network application server 17 may coordinate information through a Microsoft Transaction Server (MTS) 30. The network application server 17 may communicate via an encrypt/decrypt connection 22 and through an Internet Server Applications Protocol Interface (ISAPI) 23, which utilizes a Secure Socket Layer (SSL) security protocol in order to interface with the Interactive Voice Response (IVR) system 24, which may include an IVR processor 24(a), an encrypt/decrypt connection 24(b) and an IVR database 24(c). The IVR system 24 may be supplied by an outside vendor as shown in FIG. 1, or could be made part of the system if desired. The IVR capability allows interface with the system via a normal telephone connection or the like, wherein voice data is interpreted and recognized via the IVR system 24. Thus, even a business owner or consumer who does not own a computer may access and use the system and methods according to the invention to their advantage. As a further aspect of the invention which could be provided by an outside vendor, the system according to the invention desirably obtains location specific information for a consumer and/or business owner. Commercial mapping databases already exist, which could be easily accessed via the system according to the invention, or alternatively such information could be resident upon the system in the invention. As shown in FIG. 1, the web server 16 communicates through ISAPI 27 which uses Hypertext Transfer Protocol (HTTP) 28 to communicate with the mapping process or 29(*a*). The mapping process or 29(*a*) has the capability of accessing mapping database 29(*b*) in order to retrieve map data concerning a specified location.

Figure 2:
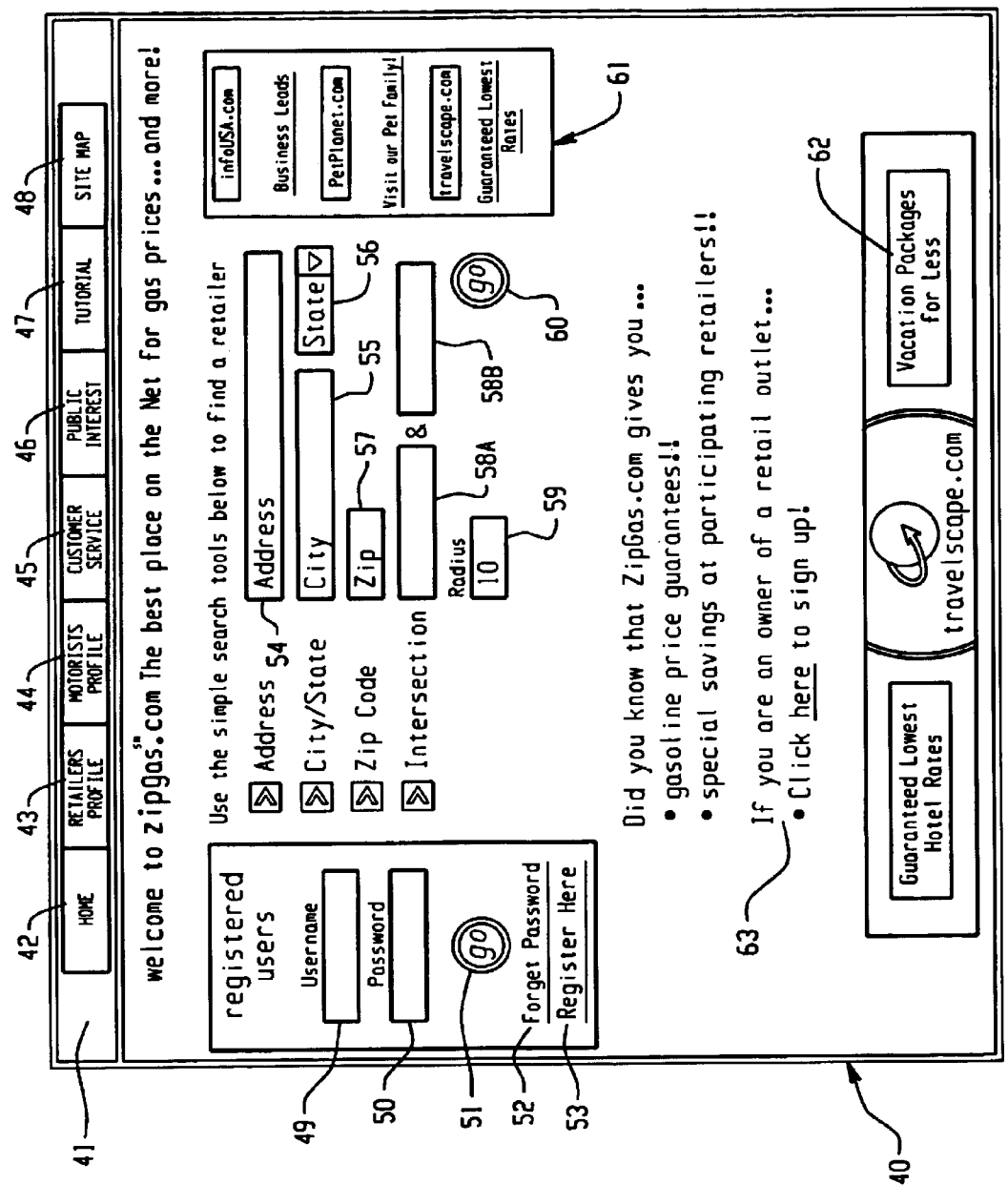

FIG. 2 refers to the interface with a user, such as a web site, and more particularly the welcome page 40 that will greet users of the invention. This graphical user interface provides several features to increase the user's efficiency in finding commodity-like goods/services, such as vehicle fuels, in the user's target area. More specifically, the system allows the owners of businesses offering commodity-like goods/services to communicate information about price or the like, as well as location information to a consumer. In addition, this page provides a method in which the user can store information for future access so that a search of relevant businesses may be stored and more easily accessed later. Welcome page 40 consists of menu bar 41 which spans horizontally across the top of the web page. This menu bar 41 may comprise convenient options that allow the user to easily navigate and locate appropriate information, as well as manipulate information where needed. These buttons may include home 42, retailers profile 43, motorist profile 44, customer service 45, public interest 46, tutorial 47, and site map 48 links to further information or pages in the system. These options may be active HTTP links that take the user of the site to the corresponding area when the user places his mouse cursor over the hypertext option and clicks the left mouse button.

Figure 3:
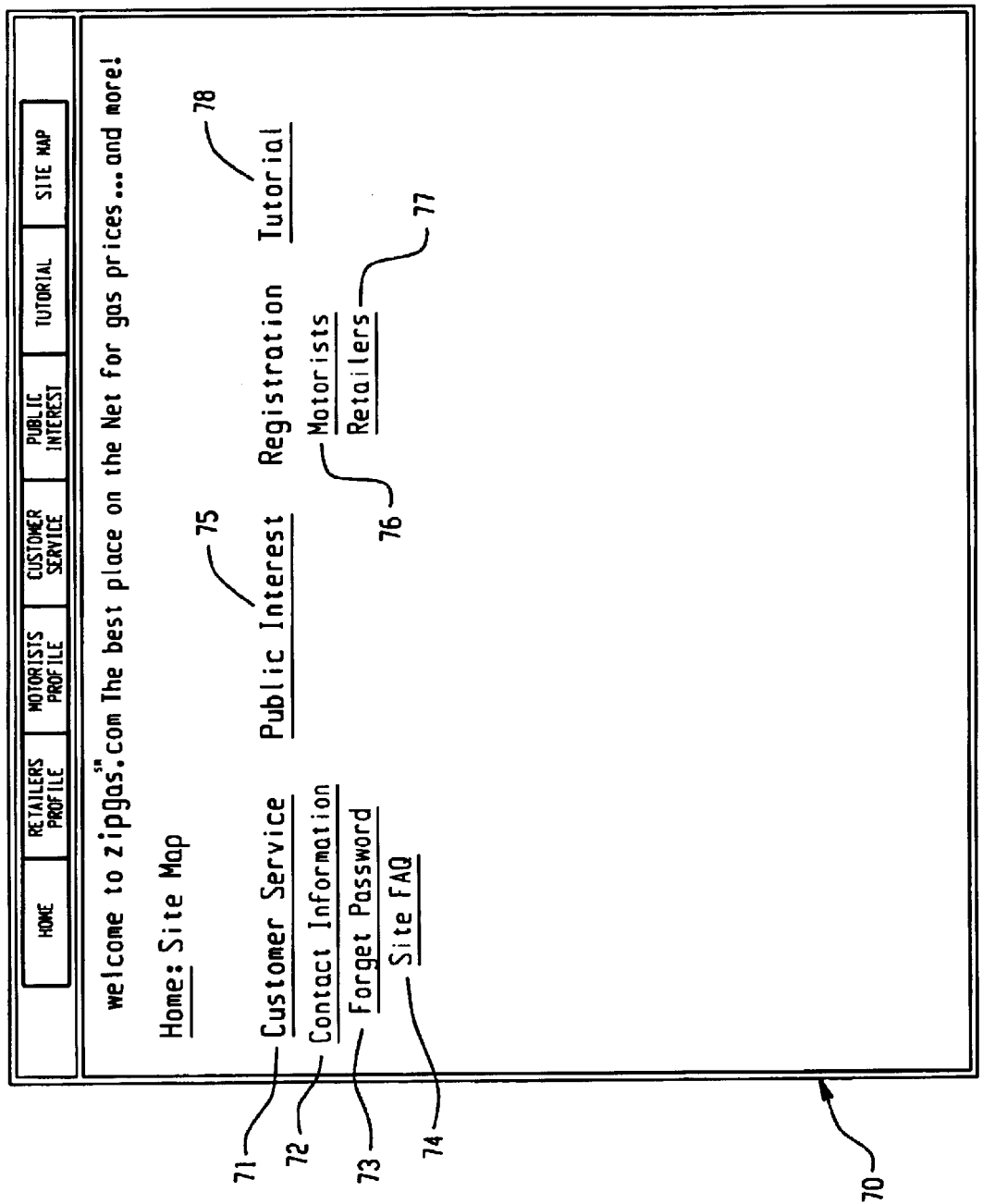

More specifically, the options in the menu bar 41 allow both retail and consumer users to build user profiles, gain access to customer service information, access information concerning public interest, and complete a tutorial of how to use the invention. The hypertext button entitled "Home" 42 allows the user to return to the welcome page 40 from any web page that the user is currently viewing. Customer service option 45 provides the user a wide variety of resources in the event a problem arises when using the system. This information will include items such as the site mailing address, phone numbers to access both general and technical information, email addresses to access general and technical information, a privacy statement, and a Frequently Asked Questions (FAQ) section with the most commonly asked questions regarding the use of the system. The public interest option 46 will provide Internet links to various web sites associated with travel and vehicle maintenance, such as motel/hotel web sites, car enthusiast web sites, tourist information or other information. The tutorial option 47 will contain information and assistance on the protocol and procedures required in establishing registration on the system, how to receive and print a price guarantee in addition to basic general tips for novice computer users. The site map option 48 will transfer the user to the site map web page 70 as shown in FIG. 3. Referring to FIG. 3, the site map page may comprise a complete set of links that will allow an experienced user to directly access a specific web page on the web site. Some specific links that will be included on the site map web page include customer service 71, contact information 72, forget password 73, public interest 75, motorist registration 76, retailers registration 77, and tutorial 78.

Figure 4:
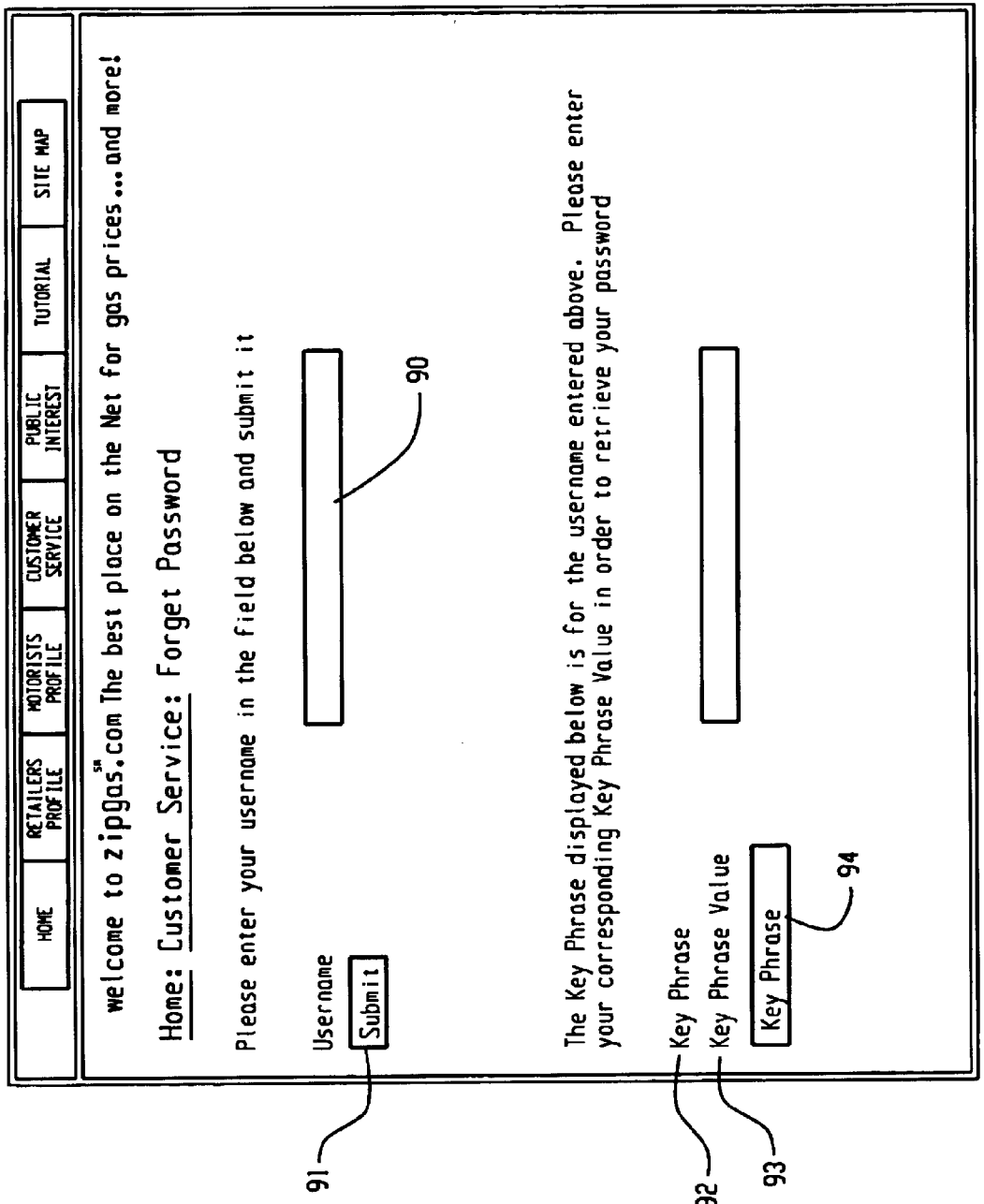
Figure 5:
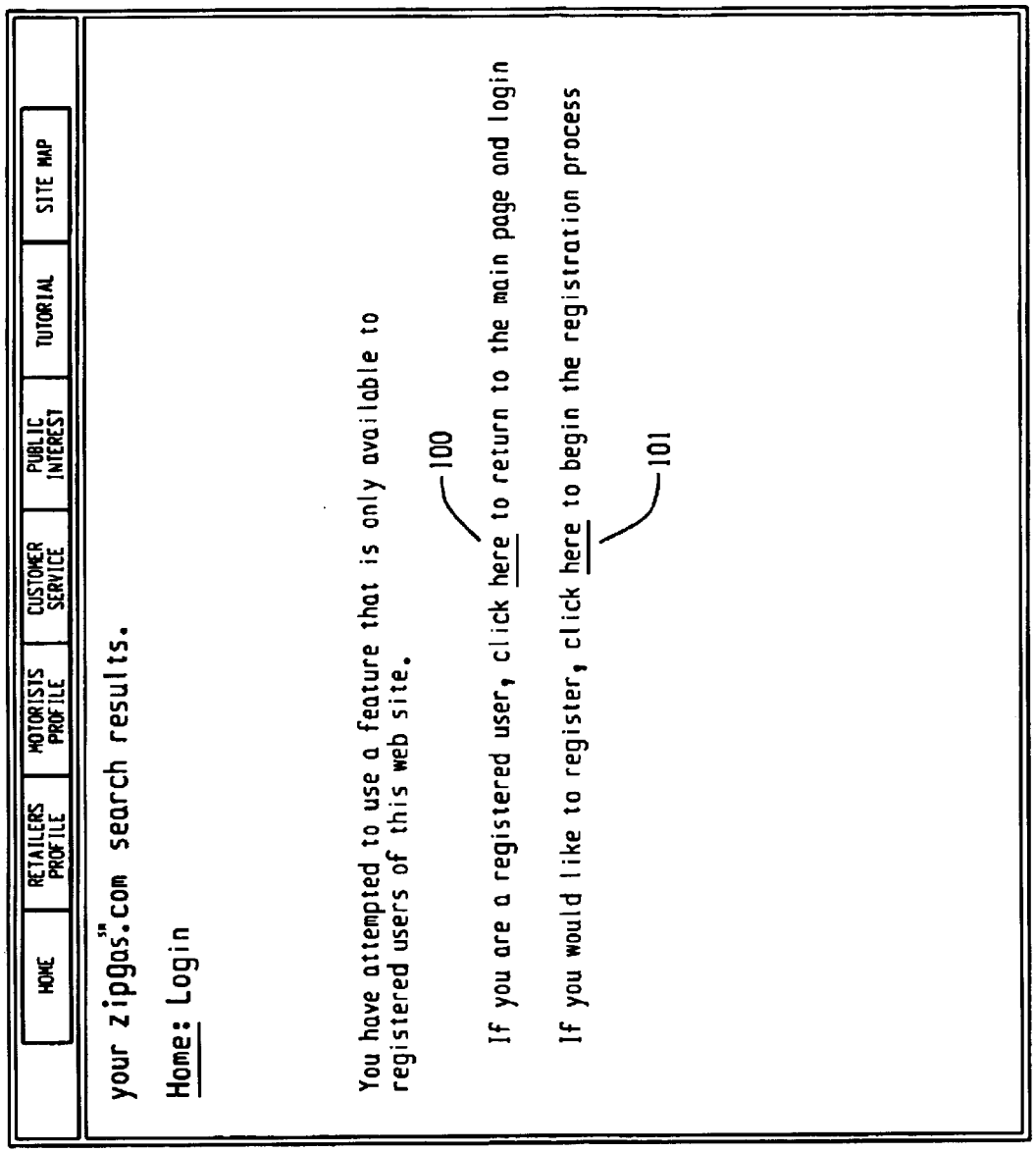
Figure 6:
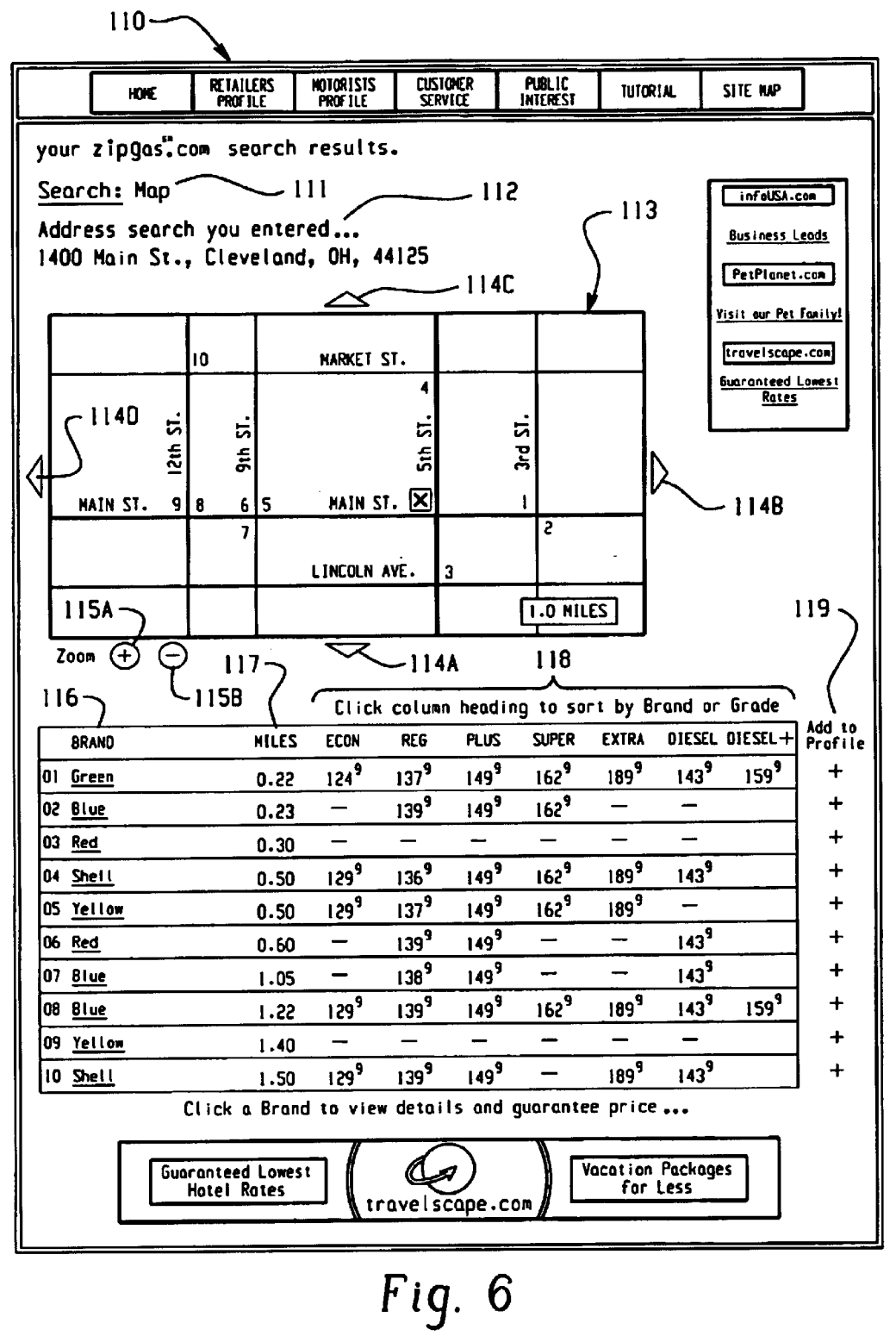

Returning to FIG. 2, on the left side of the welcome web page 40 resides an area for registered users or those retailers/consumers that wish to become registered users. In this embodiment, a registered user may store, retrieve, and/or update information in their user profiles. A registered user may access the system via a Username 49, and Password 50. The username text box 49 and password textbox 50 allow the user of the system to enter their unique username and password into the web site. After entering this data, the user then clicks their mouse cursor on the "GO" button 51 in order to gain access to their user profile, which is displayed on search results page 110 as shown in FIG. 6, that comprises the information contained in the user's profile. The user registration area may also contain active hypertext transfer protocol links entitled "Forget Password?" 52 and "Register Here" 53. Upon clicking on the "Forget Password?" link 52 the registered user is transferred to a web page as shown in FIG. 4. This page allows the user that has forgotten their unique password to be prompted with a short key phrase that the user has specified in his user profile as a clue in remembering the user's password. In order to do this, the user must enter their user name in the username text box 90, and then click the "Submit" button 91 with his computer mouse. The user will then be prompted with his key phase 92 that the user has previously defined in his user profile. The user is then required to enter the answer to the key phrase in the "key phrase value" text box 93 and then click the "KeyPhrase" button 94. After completing these steps successfully, the user's password will be displayed. The "Register Here" link 53 transfers the web site user to a user registration web site called "motorist profile" 85 where the user will be given a unique user identification and password and asked to enter other specified information. Unregistered users who attempt to access a feature reserved exclusively for registered users will be transferred to a web page as shown in FIG. 5. This web page gives the user two options; registered users must use their computer mouse and clicking the link "here" 100 and be transferred to a web page where they can log into the system to access features reserved for registered users. Unregistered users are given the hypertext link "here" 101 to be transferred to a web page to initiate the registration process.

Returning to FIG. 2, located in the center of the welcome web page 40, are text boxes that include address 54, city 55, state 56, zip code 57, intersection 58(*a*) and 58(*b*), radius 59, and a "go" button 60. These text boxes allow any user of the system to enter their corresponding information and search for locations of vehicle fuel stations or other commodity-like goods/services retailers that meet these criteria. After entering the search criteria, the user clicks on the "go" button 60 to initiate the search. Upon completion of the search, the user is taken to a search results page 110, as shown in FIG. 6, that comprises the information found in relation to the user's search.

FIG. 6 refers to a search results web page 110. The search results page 110 contains a tremendous wealth of information of interest to both consumers and retailers, particularly in times where prices are subject to rapid, volatile, and asynchronous fluctuations. Keeping ease of use in mind, the menu bar 41 is conveniently placed horizontally at the top of the web page as well as all of the web pages in the web site. Furthermore, the search results page 110 consists of a web site path 111 that shows the user the path of web sites that he has come through in arriving at the currently viewed web page. Just below the site path 111, is a search term area 112, which indicates what criteria were used in order to complete the search on the web site. A graphical map window 113 is located in the center of the search results page 110. This map 113 provides a visual depiction of where the vehicle fuel stations that met the user's search criteria are located. Alternatively, or in addition, written or spoken directions may be provided to any desired location. In addition, the map window 113 provides selection arrows 114(a), 114(b), 114(c), and 114(d) in which the map may be moved in the North, South, East, and West directions to further locate vehicle fuel stations or the like, that are not readily viewable in the map window 113. Below the map window 113, there may be provided zoom buttons 115(a) and 115(b), that allow the user to zoom in 115(a) on a specified area contained in the map window or to zoom out 115(b) from an area delimited by the map window 113. After a search has been completed, information pertaining to brand name 116, miles 117, grade 118 or other desired information elating to various retailers are shown in chart or other suitable form at the bottom of the search results page 110. The brand name 116 is a section that contains hypertext links that will transfer the consumer to the retailer's web page (FIG. 7). The retailer page may contain other helpful information that will facilitate determining what promotions, and services that the retailer is offering. The miles section 117 refers to the distance between the user's searched location and that of the retail outlet. The grade section 118 lists the price per gallon of a specific type or grade of vehicle fuel. This allows the user to easily compare and select the retailer that has the most attractive price while simultaneously determining how far from the consumer the retailer is. Finally, a consumer may also choose to add a particular retailer to their user profile by clicking his mouse cursor on the "+" symbol 119 located in the "Add to Profile" column. This feature of the site is beneficial in that a registered consumer does not have to complete a new search to retrieve the same retailer's information when the consumer wants to locate the retailer on a subsequent visit to the web site.

FIG. 7 refers a specific retailer page 139 that is accessed when a consumer selects and clicks on a particular brand name hypertext link 116. This page contains brand information 71 and the corresponding grade price for each specific grade of fuel or the like at 72. The customer also has the option of clicking on the "Refresh Prices" hypertext link 131 to update the prices that are presently being viewed on the web page to reflect the most up to date prices that have been specified by the retailer. After viewing the retailer's web page, the consumer can add the retailer into their personal profile by clicking on the "Add to Profile" hypertext link 132.

Another feature of the system and methods herein relates to the ability of being able to provide a price guarantee for specific commodity-like goods/services, where price is sensitive and volatile, such as with the purchase of fuel according to this embodiment. Thus, when a consumer using the invention finds a particular brand, grade, and price of vehicle fuel that they wish to purchase, the consumer will get a guarantee on that price for a specific period of time set by the retailer. The consumer may receive the price guarantee by selecting the "Print Guarantee" hypertext option 133 with his mouse, or other suitable methods. By selecting "Print Guarantee" 133 the consumer is transferred to the price guarantee web page to be described hereafter. The page shown in FIG. 7 may also be provided with a section entitled "Features" 134 that details any special services that the retailer may have to offer a consumer such as an ATM, Car Wash, Oil Change, Credit Cards, etc. Located in the center of the web page is the retailer's "Address" 135 that includes items such as outlet address, phone number, email address, and world wide web address if available. Just below the retailer's address 135, is a "Special Messages" section 136 that gives information concerning promotions and items for sale by the retailer. This "Special Messages" section 136 could allow the consumer to click on the promotional hypertext bulletin and print out a money saving coupon for an item or service.

Other features that could be offered to a consumer as a further aspect of the invention, such as the ability to schedule automotive services on the retailers page on the web site. A consumer that is interested in a particular service could click his mouse on the applicable service in either the "Features" section 134 or "Special Messages" section 136 and be transferred to a service scheduling web page. This scheduling web page may contain the openings for when the consumer could bring his car in for service (i.e., tune-up, oil change, etc.). Upon selecting a convenient time, the consumer would enter their personal information into the scheduling web page to complete the reservation for those services.

Figure 8:
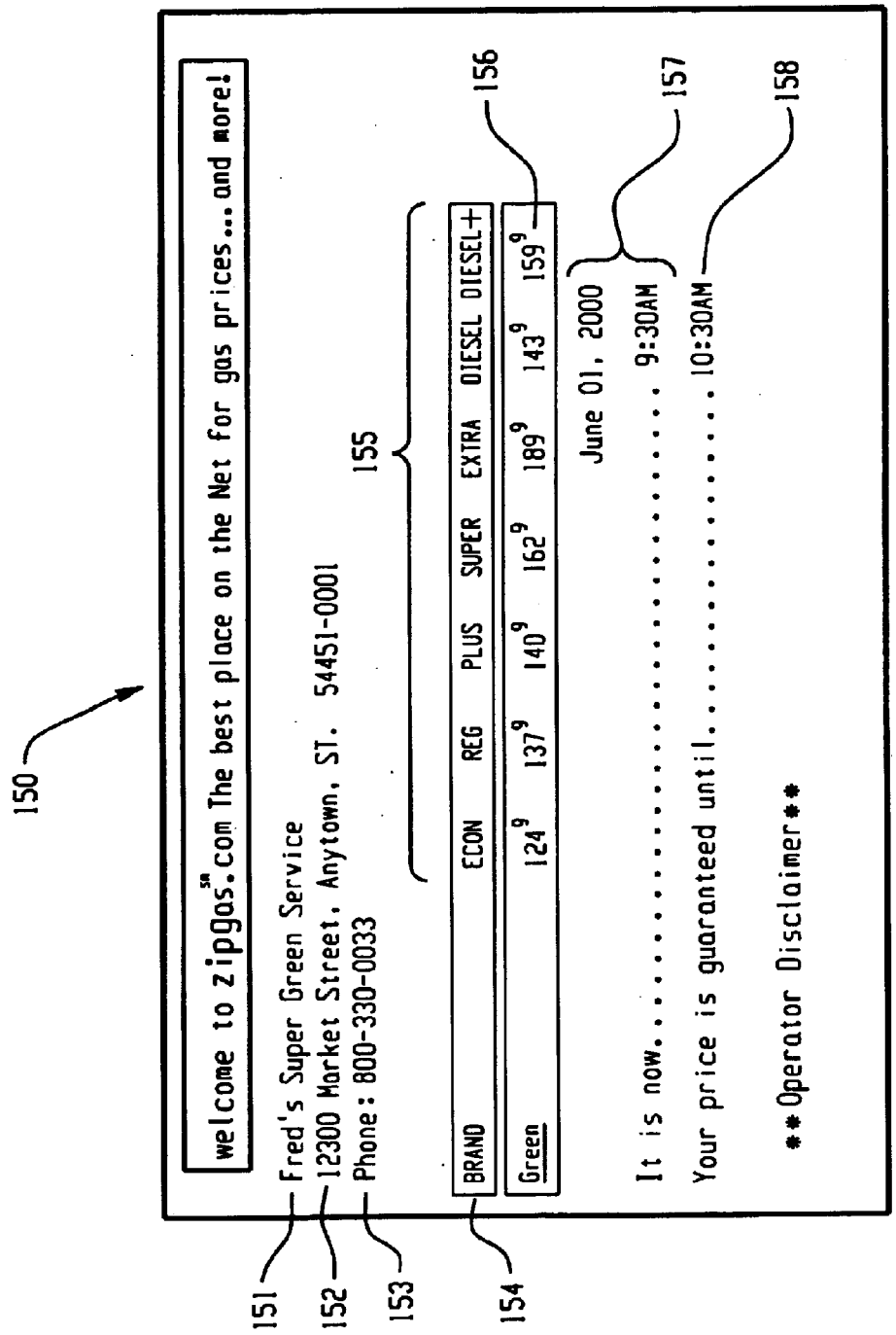

Turning to FIG. 8, the price guarantee 150 in this embodiment contains specific information about the retailer from which the consumer has selected to purchase vehicle fuel or other commodity-like goods/services or the like. The form of the guarantee may be of any suitable type, and that shown in this Figure is merely an example. In the upper left corner the retailer's name 151, address 152, and phone number 153 are indicated. The grades of vehicle fuel 155 and corresponding prices per gallon 156 are shown as they occurred in the market when the consumer received the price guarantee. The price guarantee also indicates the date and time 157 in which the consumer printed the price guarantee 150. The price guarantee 150 also states when the guarantee will expire 158. If desired, the retailer could also place other limits or conditions on the guarantee, such as with respect to the volume of vehicle fuel which can be purchased at the guaranteed price as an example.

Other methods of providing the price guarantee are also contemplated, such as through the use of barcode scanning technology. After the consumer has selected the particular brand and type of vehicle fuel, they will be given the opportunity to print a barcode that will contain the consumer's unique user ID, the location of the retail outlet, the time at which the consumer selected the vehicle fuel, and the guaranteed price itself. The consumer would then take this printed bar code to a bar code scanner that is placed on the retailer's vehicle fuel pump. The bar code would then charge the consumer's credit card with the applicable guaranteed price. This would drastically decrease the time that it would take to have a printed price guarantee verified by a retail associate. Furthermore, the bar code scanning technology would increase the traffic at the pump, which is at a premium when vehicle fuel prices are at higher than typical prices and the retailer has an attractive price. Finally, this technology provides speed and efficiency that many consumers demand because people do not enjoy waiting in lines to pay for basic, essential commodity-like goods/services. Other suitable methods are also contemplated, such as through the use of smart cards, flash memory cards or other suitable interfaces.

Turning to FIG. 9, the "Motorist Profile" web page 160 is shown. This page is accessed through the motorist profile hypertext button 44 or "Register Here" hypertext link 53. The consumer is then prompted to enter basic user information 161 into the following text boxes that may include for example: first name 162, last name 163, consumer's street address 164, street address #2 165, city 166, state 167, zip code 168, phone number 169, email address 170. Next, the user is prompted to enter login information 170, which may comprise username 172, password 173, and verify password 174 text boxes. These pieces of information are unique to the user and provide a means to keep the consumer's user profile private. The next section is the key phrase information section 175. This information is collected to assist a person that has forgotten their password. The key phrase information section 175 contains the Key Phrase text window 176 and Key Phrase Value window 177. The consumer is prompted to enter a key phrase that will trigger the consumer's memory into remembering his correct key phrase value 177. Upon entering this value, the consumer will be given his password, so that they may access their user profile. The next element of the motorist profile 160 is the list of stored outlets 178 which contains a listing of retail outlets that the consumer has chosen to keep in their user profile. The information stored on retail outlets may be comprised of the outlet's address 179, brand name 180, and types of vehicle fuel and corresponding price 182 of the competing retailers. The consumer can also choose to remove a specific retailer from his stored outlets section by using his mouse and clicking on the "Remove" button 183. The consumer can also choose how he wishes to sort the stored outlets list 178 by choosing an option in the sorting preference selection box 184. The motorist profile web page 160 also allows the consumer to use the IVR listening preference box 185, to select what brand and grade of vehicle fuel that the consumer wishes to get information on over the IVR telephone system. Once the user has selected or updated the information on the motorist profile 160, the user selects and click the submit button 186.

Figure 10:
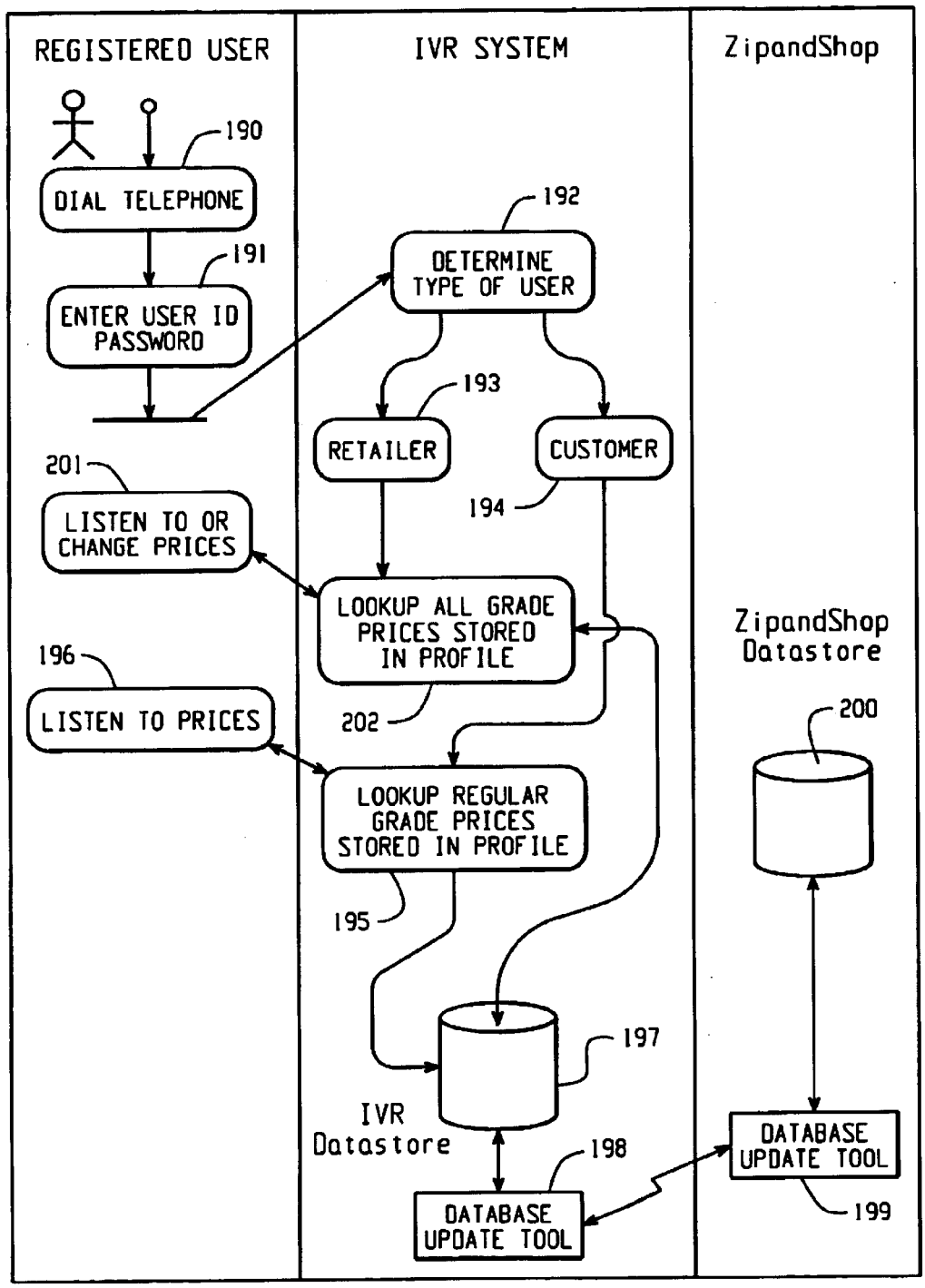
FIG. 10 shows a block diagram of an Interactive Voice Response (IVR) subsystem according to an embodiment of the invention.

In FIG. 10, there is shown a flow chart that describes the steps in which a consumer that has registered with system uses the IVR system. The IVR system allows a consumer to use their phone, such as by use of the touch tone phone keypad as an input device, as a means to answer pre-defined questions posed by the system. This system affords registered consumers the ability to use a standard telephone to ascertain the price of a particular brand and grade of vehicle fuel or other commodity-like goods/services which the consumer has previously selected by using the IVR Listening Preference drop box 185 via the motorist profile web page 160. To access the IVR system, the consumer must dial a telephone number 190 that is determined by the system. Upon accessing the system, the consumer is required to enter their unique user identification and password 191. The IVR system then determines what type of user that the caller is at 192. This is done by either asking the caller to identify themselves as either a consumer or a retailer or by using the user's ID. After the caller is determined to be a customer 194, the IVR system may be used to retrieve the specific brand, type, and price of vehicle fuel 195 that the consumer has selected in their IVR listening preference drop box 185 which resides on the system data store 200. Finally, after the price information is retrieved, it is replayed over the phone to the customer in the form of an automated voice 196 or other suitable method.

Alternatively, the consumer IVR user could be given a unique numerical code that could be used to identify the consumer, verify the outlet where the consumer wants the price guarantee, and the time at which the consumer received the price guarantee. Now the consumer can proceed to the retail store, where many vehicle fuel pumps have numeric touch pads at the pump (point of purchase), and input this code and receive the vehicle fuel at the guaranteed price which in turn is charged to the consumer's credit card. This process may again accelerate the transaction process at the pumps and allows greater turnover or throughput for each pump. Other commodity-like goods/services could also be purchased or arranged in a suitable fashion to that described with reference to vehicle fuel. The capabilities offered by the system to the retailer are also made available through the telephone via an IVR system as shown in FIG. 10, and detailed later in this document.

FIG. 11 refers to the retailer profile web page 205. This page is provided in order to allow retailers to register as subscribers to the system. The retailer profile page 205 consists of basic user information 206 that is to be entered by the retailer. This information may include the following as an example: first name 207, last name 208, retail outlet name 209, vehicle fuel name 210, brand name 211, street address 212, street address #2 213, city 214, state 215, zip code 216, phone number 217, fax number 218, and email address 219. The retailer is further prompted to choose whether to display their email address 220, and/or prompted to enter his web site address 221, and their retail outlet/ company motto 222. Next, the user may be prompted to enter his login information 223, comprising username 224 and clerk's username 225. These pieces of information provide security for the retailer so that only authorized personnel are able to update or change information that is contained in the retailer's profile. The retailer is also required to enter key phrase information so that if the retailer or retailer's clerk forgets their password, can be recalled it after giving an answer to a user determined question. Thus, the retailer must enter their key phrase 227, such as a short question that only the retailer should know the answer to. The key phrase value 228 is the answer to the key phrase 227. A key phrase is also provided for the retail clerk so that they can access the retailer's user profile so that they can update the content of the retailer's web page if the retailer desires such access. The clerk's key phrase data is entered in the clerk's key phrase text box 229 and the answer to the key phrase is made in the clerk's key phrase value text box 230.

Figure 12:
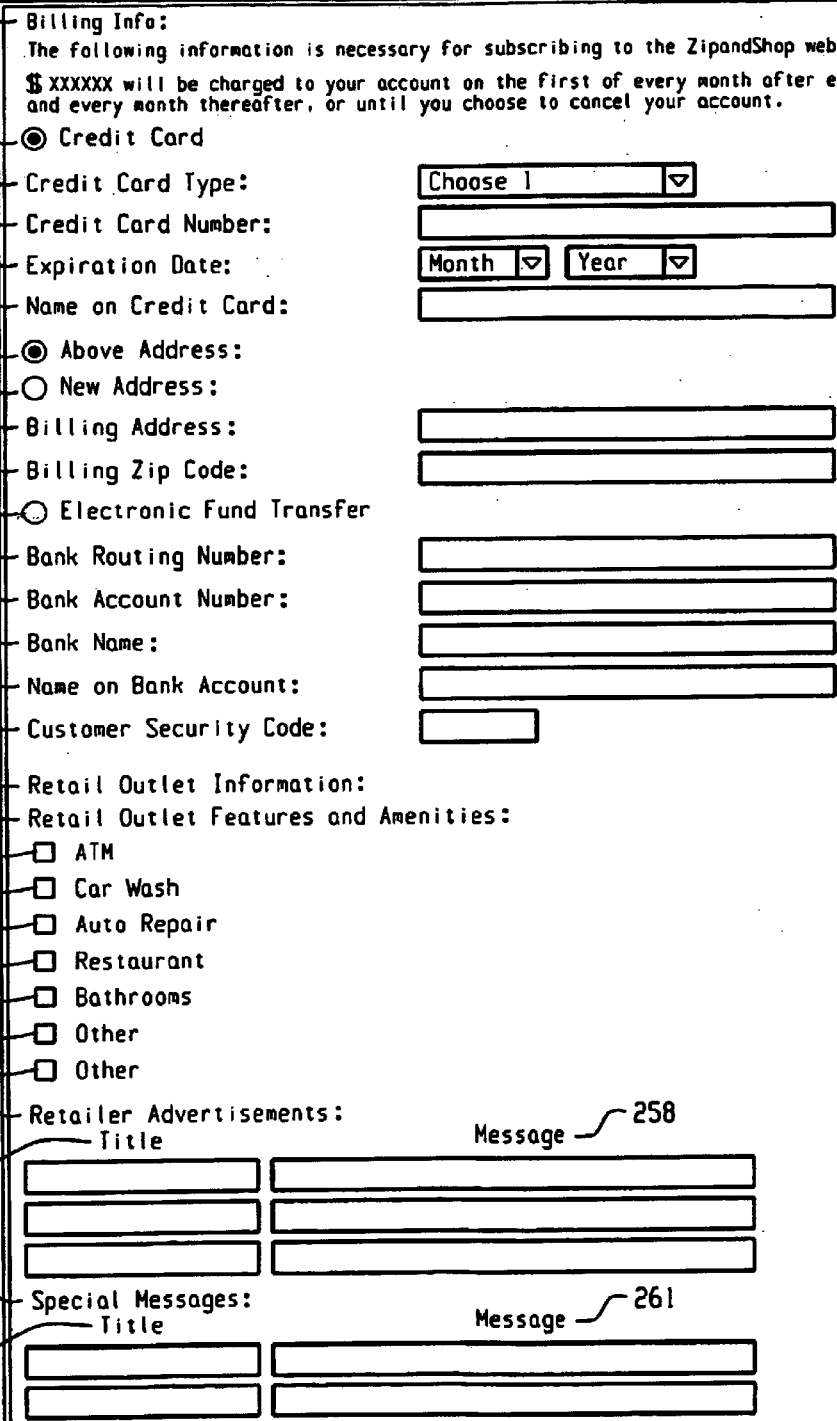

FIG. 12 is a continuation of the retailer profile web page 205 that contains a section called "Billing Info" 231 which must be completed before a retailer can be registered with the inventive service. This section requires the retailer to select the type of method in which the retailer will pay the site for the services provided. This is done by clicking with left mouse button one of two options; either credit card 232, or electronic funds transfer 241. If the retailer selects credit card billing 232, the retailer is prompted to select from a drop box entitled "credit card type" 233 the type of credit card that the retailer is going to use as payment. The retailer is also prompted to enter the credit card number 234, the card's expiration date 235, and the name on the credit card 236. The user is also prompted to specify which address the billing information should be sent. This task is completed by clicking the mouse on either the "above address" option 237 or on "new address" option 238. If the "new address" option 238 is selected, then the retailer is required to input the new billing address 239 and the new billing zip code 240. However, if the retailer selects electronic fund transfer 241, then the retailer must input the bank routing number 242, bank account number 243, bank name 244, name on the bank account 245, and customer security code 246.

Figure 13:
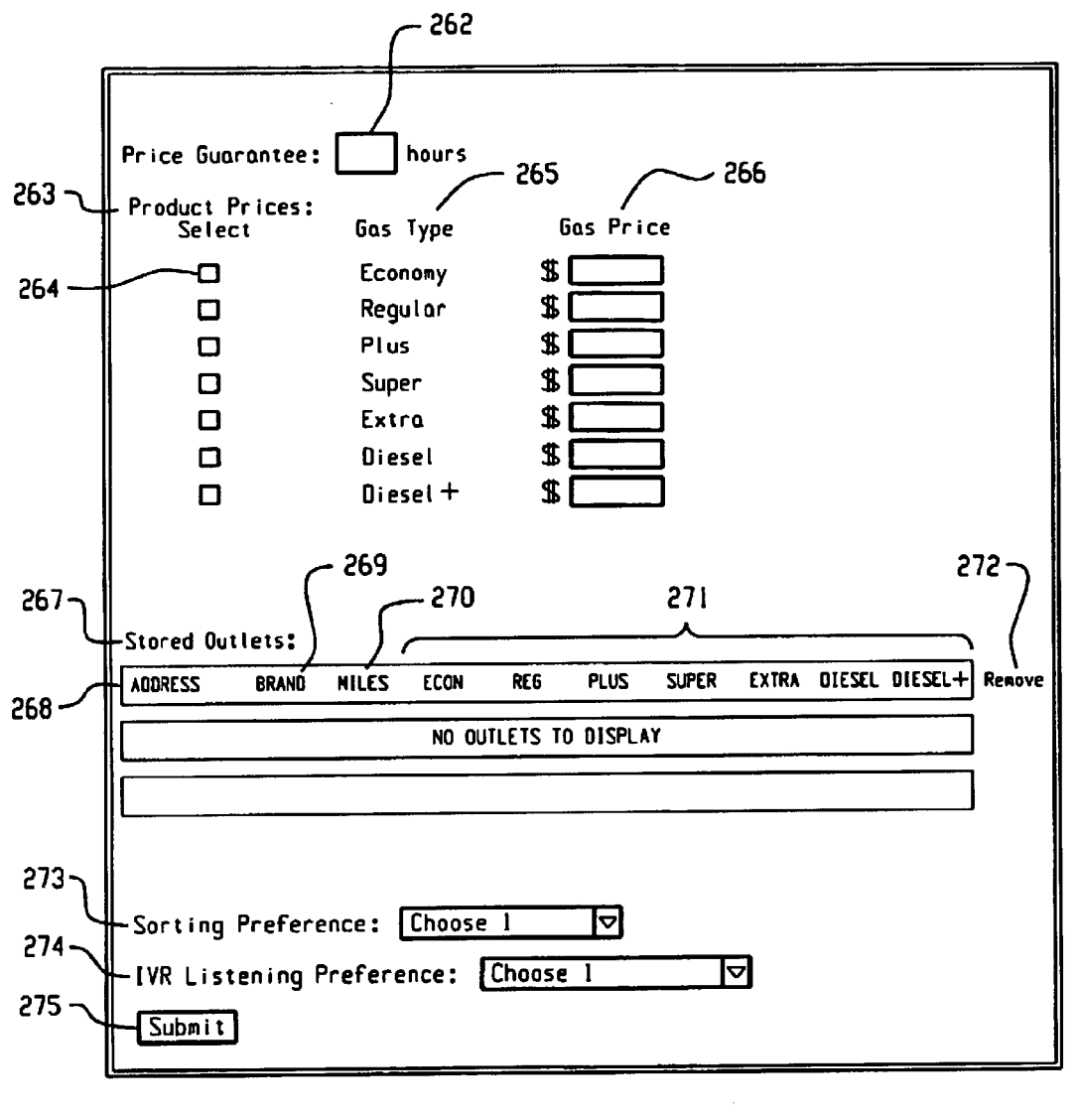

The next section of the retailer profile web page 205 is called retail outlet information 247. This section allows the retailer to enter information about goods/services that it provides, which the retailer wants posted on its site web page 139 to be viewed by consumers. Further, this section provides boxes in which the retailer can identify the amenities and services that the retailer offers to the consumer. These items may include an ATM 249, car wash 250, auto repair 251, restaurant 252, bathrooms 253, etc. This information will be shown on the retailers web page if the retailer clicks the corresponding check box. The retailer also has the opportunity to place advertisements 256 on their web page by entering a title 257 and a message 258 in the retailer advertisements section 256 of the retailer profile web page 205. This feature of the service allows competitors to be highly responsive to another competitor's business decisions. The retailer is also given the opportunity to post special messages 259 to its customers regarding specials or limited offers by entering a title for the message 260, and entering a message 261. FIG. 13 is a continuation of the retail outlet information section that is contained in the retailer profile web page 205. The next section of retail outlet information pertains to the commodity-like goods/services that are being sold by the retailer and price guarantee information. This section allows the retailer to enter the number of hours or other time increment that the consumer has to redeem a price guarantee starting from the time the price guarantee is issued until the price guarantee expires. This is done by entering the length of time that the retailer wants to make the guarantee valid in the price guarantee box 262. Next, the retailer is prompted to select what type or grade of vehicle fuel 265 that a price will be provided for on the web site by clicking on the corresponding "selection" box 264. After selecting a type of good/service, such as vehicle fuel, the retailer must enter the corresponding price 266 for the particular commodity-like goods/services.

The method and system according to the invention also provides a unique opportunity for retailers to access real-time data relating to selling of commodity-like goods/services and particularly which may relate to data of competitors. The invention provides registered retailers a means of collecting and sorting current real-time data as well as the capability to access historical trend data of competitors. The system also collects raw price and purchasing data and can be used to produce custom marketing trend reports for retailers. This data may include information such as the brand name of goods, grades of goods/services, the location of goods, and the timing and frequency in which a consumer has purchased the goods/services. Traditionally, retailers must physically obtain the price data first hand or pay various third parties to gather the data, which is not often comprehensive in scope. Therefore, the system and methods are a tremendous asset to any business that participates in the competitive commodity-like goods/services market or in other business environments. The retailer profile web page 205 also allows the retailer to store and track a list of competitors. By selecting which competitors the retailer wishes to track, the retailer can view the competitors' prices for each grade or type of vehicle fuel 271, the distance that a competitor is from the retailer 270, the name brand of the competitor 269, and the address of the competitor 268, or other information. However, if a retailer is no longer interested in tracking a competitor then the retailer may remove the corresponding competitor by selecting the remove button 272. This remove button 272 could bring up a further web page to finalize the removal of a competitor or it could instantaneously remove the competitor's listing that is correspondingly adjacent to a particular remove button 272. Once a retailer has selected all of the competitors that it wishes to track, they may sort them according to various criteria such as price, competitor name, and distance from retailer by selecting a criteria using the sorting preference drop box 273. The retailer is also given the option of which types of vehicle fuel that it wishes to hear on the IVR telephone system by choosing an option in the IVR listening preference drop box 274. Once the retailer has entered all applicable information into the retailer profile 205, the "Submit" button 275 will forward the information to the web site and store the information for subsequent access.

The information compiled by the site relating to information on possible competitors and demographic information relating to customers may also be analyzed using appropriate software products. This information can then be presented in a useful fashion on an updated basis, such as reports, graphs or other forms to allow the user to use the data in their business planning. In this manner, the retailer can obtain information on their consumers and competitors, as well as trends or other market factors that will facilitate business operations. The capabilities offered by the system to the retailer are also made available through the telephone via an IVR as shown in FIG. 10. In order for a registered retailer to access the IVR system, they must dial a predetermined access number 190. The retailer is then prompted for his user ID and password 191. Next, the IVR system determines whether the user is a retailer or a consumer 192. After ascertaining that the IVR user is a retailer 193, the IVR system retrieves all of the types and prices of vehicle fuel that the retailer specified in the IVR listening preference drop box 274 on the retailer profile web page 205. This data is accessed from the IVR data store 197 and the system data store 200, which utilizes corresponding database update tools 198 and 199. Once the retailer's IVR preferences are retrieved, the corresponding types and prices of vehicle fuel are transmitted over the phone line by using an automated voice 201. If the retailer chooses, they may change or edit their web page, such as the prices of the types of vehicle fuel they sell, by using the telephone touch pad to enter the new price information. This new, updated information is automatically updated on the retailer's web page 139.

FIG. 14 refers to the "Clerk Profile" web page 281. This web page requires that the clerk enter the following information as an example: clerk's first name 282, last name 283, retail outlet name 284, vehicle fuel name 285, brand name 286, retailer's street address 287, street address #2 288, city 289, state 290, zip code 291, phone number 292, fax number 293, and email address 294. Next, the clerk is asked to click a "yes" or "no" button 295 with his mouse to determine whether the clerk wishes to display his email address on their web page 139. In addition, the clerk is prompted to enter his web site address 296, and retail outlet/company motto 297. The next section of the clerk profile web page is called "login information" 298 which consists of the clerk's user name 299, clerk's password 300, and a second text window called verify clerk's password 301. This information is required to establish and maintain security on the retailer's web page 139 so that an unauthorized user cannot access the retailer's web page and make unwanted changes. In the event that a retail clerk has forgotten their password, the clerk can answer a predetermined question that is established by the retail clerk which the clerk enters into the text window entitled clerk's key phrase 303. The clerk must then enter the corresponding answer or key phrase value 304.

FIG. 15 is a continuation to the clerk's profile web page 281. In the text box entitled price guarantee 306, the retailer may enter how long he wishes the price guarantee to be in effect. The retailer can also select which types of vehicle fuel he wants displayed on the system. The retail does this by using his mouse button and clicking a specific check box 308 in the column entitled "select" that is adjacent to the corresponding type of vehicle fuel 309. In addition, the retailer may change or update the prices of commodity-like goods/services; or as in the embodiment shown, the price of vehicle fuels. These prices will be automatically updated on the retailer's web page 139. A final section of the clerk profile web page 281 called "stored outlets" 311 contains the address 312, the brand name 313, the miles the competitor is from the retailer in the "miles" column 314, and the corresponding price for each type of vehicle fuel 315 sold by each competing retailer that the clerk has chosen to add to his clerk profile 281. In addition, the clerk can sort the chart of competitors by various criteria that are listed in the sorting preference drop box 316. The clerk may also update or change the types of vehicle fuel that are posted on the IVR telephone system by choosing the appropriate option in the IVR listening preference drop box 317. After all changes or updates have been made to the clerk profile 281, the clerk must then use his computer mouse and click a button entitled "submit" 318 so that the changes can take effect to the retailer's web page 139.

An alternate embodiment of the present invention may be implemented using a combination of a user locating system, such as the Global Positioning System (GPS), cell phone locating or other suitable method, and mobile web browsing electronics as shown in FIG. 16. In this embodiment, a consumer that is navigating their vehicle can determine the location of vehicle fuel stations, service stations, convenience stores, hotel, restaurants, auto supply stores or other desired locations that are in proximity to the user. Specifically, the consumer will have a locating system, such as GPS navigation receiver 326 on-board the vehicle that will ascertain the consumer's location coordinates from GPS satellites 327. The system may then use a wireless method of transmission to access the system or other network 328 and upload the user's GPS location coordinates. The system may then transmit the consumer's positional data via the Internet to a mapping service 329, which has access to a system database 330 that contains the locations of various vehicle fuel stations, hotels, restaurants or other desired locations. The mapping service queries the system database 330 for the specific entity being searched and then places the locations that meet the consumer's requirements (such as distance) on a user-friendly electronic map. This map information is then transferred back to the system at 332 in HTTP form where it is then transmitted through a wireless application service provider to the customer's in-vehicle wireless device for display 331.

Furthermore, the system and methods of the invention can be easily applied and adapted to a host of other business models such as the hotel, restaurant, and medical industries. The retail consumer's ability to search, find, and locate various commercial entities which are in a close proximity to the consumer is of a very high utility. As wireless communication advances, the system of the present invention can be used by consumers and retailers or other entities to facilitate locating, selecting and purchasing goods/services.

Although the principles, particular embodiments and operation of the present invention have been described in detail, the foregoing should not be construed as being limited to the particular illustrative forms of the invention as disclosed. It will become apparent to those skilled in the art that various modifications of the embodiment shown herein can be made without departing from the spirit or scope of the invention as defined in the following claims.

What is claimed is:

1. A method of a consumer obtaining and a retail outlet honoring a fuel price guarantee, comprising the steps of:
   a) obtaining subscriptions to a service provider via a user interface, wherein subscribers are retail outlets that offer fuel within a geographical region;
   b) inputting by each of said subscribers its own real-time information into a central database via said user interface, wherein said real-time information includes a fuel, a fuel price and an associated fuel price guarantee;
   c) storing said real-time information into said central database, wherein said stored real-time information is accessible to a consumer;
   d) said consumer searching said central database for said stored real-time information;
   e) said consumer selecting a fuel, a fuel price and said associated fuel price guarantee from said central database;
   f) said consumer obtaining a printout or other form of commitment relating to said associated fuel price guarantee, wherein said fuel price guarantee printout or other form of commitment contains at least a physical location of the retail outlet associated with the fuel, the time at which the consumer selected the fuel, the real-time price of the selected fuel, and an authenticating time period;
   g) said subscriber authenticating said fuel price guarantee or other form of commitment within said authenticating time period at said associated physical retail outlet; and
   h) said consumer purchasing said fuel at the associated physical retail outlet at the effective price specified on said fuel price guarantee printout or other form of commitment.

2. The method according to claim 1, wherein the price guarantees are offered for a limited time by a subscriber based upon the time the guarantees were issued by the subscriber via the user interface.

3. The method according to claim 1, further comprising the step of allowing a user to pre-determine from said database a subscriber to predetermine from said database a subset of competitor outlets within a geographical region, which subset is displayed to the subscriber upon entry of subscriber-identifying information.

4. The method according to claim 1, further comprising the step of allowing a subscriber to pre-determine from said database a subset of competitor outlets within a geographical region, which subset is displayed to the subscriber upon entry of subscriber-identifying information.

5. The method according to claim 1, wherein said information is input to a computer readable storage medium through a global information system.

6. The method according to claim 1, wherein said user interface allows a subscriber to input said information by voice or by touch-tone telephone.

7. The method according to claim 1, wherein the user interface allows current price information to be input only by a subscriber and relating only to the subscriber's own retail outlet.

8. The method according to claim 1, wherein said information is directly downloaded by a subscriber from the central database.

9. The method according to claim 1, wherein said database includes information, relating to individual subscribers within said plurality of subscribers, the information selected from the group consisting of types of retail outlets, specified locale of said retail outlets, brand information, other goods/services offered at said outlets, price information, special promotions on goods/services sold at said outlets, price guarantees on goods/services sold at said outlets or combinations thereof.

10. The method according to claim 1, wherein said central database is accessed by subscribers for the purpose of monitoring competitor retail outlets.

11. The method according to claim 10, further comprising the step of allowing a subscriber to pre-determine from said database a subset of competitor outlets within a geographical region, which subset is displayed to the subscriber upon entry of subscriber-identifying information.

12. The method according to claim 1, wherein said information in said central database is accessed through a user interface.

13. The method according to claim 1, wherein said user interface is accessible by at least one commmunication device selected from the group consisting of a computer, wireless communication device, telephone or combination thereof.

14. The method according to claim 13, wherein said user interface is accessible by a communication system onboard a vehicle which supplies said system with information on the location of said vehicle, sais system providing information on retail outlets in relative proximity to said vehicle based upon said location.

* * * * *

UNITED STATES PATENT AND TRADEMARK OFFICE
CERTIFICATE OF CORRECTION

PATENT NO. : 6,965,872 B1
DATED : November 15, 2005
INVENTOR(S) : Jerome M. Grdina It is certified that error appears in the above-identified patent and that said Letters Patent is hereby corrected as shown below:

Column 16,
Line 7, replace "provider" with -- provided --.
Line 44, delete "subscriber to predetermine from said database a".
Line 45, delete "competitor".
Lines 46 and 47, replace "subscriber" with -- user --.

Column 18,
Line 5, replace "commmunication" with -- communication --.
Line 12, replace "sais" with -- said --.

Signed and Sealed this

Twenty-first Day of March, 2006

JON W. DUDAS
*Director of the United States Patent and Trademark Office*